US009787478B2

(12) United States Patent
Lee et al.

(10) Patent No.: US 9,787,478 B2
(45) Date of Patent: Oct. 10, 2017

(54) SERVICE PROVIDER CERTIFICATE MANAGEMENT

(71) Applicant: QUALCOMM Incorporated, San Diego, CA (US)

(72) Inventors: Jangwon Lee, San Diego, CA (US); Anand Palanigounder, San Diego, CA (US); Soo Bum Lee, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 14/736,055

(22) Filed: Jun. 10, 2015

(65) Prior Publication Data

US 2016/0365984 A1    Dec. 15, 2016

(51) Int. Cl.
*H04L 9/00* (2006.01)
*H04L 9/32* (2006.01)
*H04L 9/08* (2006.01)

(52) U.S. Cl.
CPC .......... *H04L 9/3268* (2013.01); *H04L 9/0894* (2013.01); *H04L 9/321* (2013.01); *H04L 9/3247* (2013.01); *H04L 9/3263* (2013.01)

(58) Field of Classification Search
CPC .............................................. H04L 2463/061
See application file for complete search history.

(56) References Cited

U.S. PATENT DOCUMENTS

| 5,379,344 | A | 1/1995 | Larsson et al. | |
|---|---|---|---|---|
| 6,141,752 | A | 10/2000 | Dancs et al. | |
| 8,327,152 | B2 | 12/2012 | Russell et al. | |
| 8,347,080 | B2 | 1/2013 | Bender et al. | |
| 2003/0177363 | A1 | 9/2003 | Yokota et al. | |
| 2006/0020784 | A1* | 1/2006 | Jonker | G06F 21/10 713/157 |
| 2011/0047373 | A1* | 2/2011 | Karasawa | G06F 21/33 713/156 |
| 2013/0111550 | A1* | 5/2013 | Naveh | G06F 9/468 726/3 |

(Continued)

OTHER PUBLICATIONS

International Search Report and Written Opinion—PCT/US2016/027436—ISA/EPO—dated Jul. 20, 2016—11 pgs.

(Continued)

*Primary Examiner* — Josnel Jeudy
(74) *Attorney, Agent, or Firm* — Hunter Clark PLLC

(57) ABSTRACT

A method includes: establishing a telecommunication link between a device and a service provider system via a telecommunication network; receiving a device public key via the telecommunication network from the device at the service provider system, the device public key predating the establishment of the telecommunication link; verifying, at the service provider system, that the device stores a device private key in a secure storage area of the device, the device private key corresponding to the device public key, the device public key and the device private key being a cryptographic key pair; and authorizing, by the service provider system, sign-up of the device for service enrollment in response to verifying that the device stores the device private key in the secure storage area of the device.

27 Claims, 8 Drawing Sheets

(56) References Cited

U.S. PATENT DOCUMENTS

2014/0095863 A1    4/2014  Liu et al.
2014/0108785 A1    4/2014  Lindteigen et al.
2014/0208096 A1    7/2014  Brandwine et al.

OTHER PUBLICATIONS

Second Written Opinion from International Application No. PCT/US2016/027436—European Patent Office—Munich, Germany—dated May 4, 2017—7 pgs.

* cited by examiner

SERVICE PROVIDER CERTIFICATE MANAGEMENT

BACKGROUND

Electronic communication is commonly used to obtain a wide variety of information. For example, users may obtain current or past news, entertainment content, research information, how-to information, etc. Further, the information may take a variety of forms, such as print, images, video, audio, and combinations of these. The information may be obtained using one or more service providers that provide access and/or content services. For example, the information may be obtained by a user device communicating with a content provider via one or more access providers (e.g., telecommunication networks, network gateways, etc.) and downloading the information from the content provider via the access provider. The information obtained may be available for free, or may require a payment (e.g., a paid subscription) by the user to the content provider and/or the access provider. For example, a user may need to pay for a subscription to a service provider before that service provider will provide content to the user. The user may be able to select which services the user wants from any particular service provider such that different service providers may provide different services to the same user, and the same service provider may provide different services to different users. Also or alternatively, the user may pay for access to a network, e.g., paying a hotel for access through hotel-owned access points to the Internet.

For paid subscription services, determining the authenticity of the requesting party and the authorization of that party for the requested service is paramount. One existing technique for obtaining subscribed-to services has a user establish a username and password during enrollment for services. Alternatively, the username and password may be provided, at least initially, by a service provider. The username and password is then used each time that service is desired. Another technique for obtaining subscribed-to services has a device provide the same device certificate to each service provider from which service is desired. The certificate includes information such as a device identity, a public cryptographic key (public key) associated with the device (i.e., corresponding to a private key stored by the device), and a digital signature. With the same device certificate used for every service provider (SP), the certificate lacks customizability compared with a service provider providing a custom certificate that may include service-provider-specific (SP-specific) information such as authorized (e.g., paid for) service, expiration of a user's subscription, etc. Another existing technique for obtaining subscribed-to services has a service provider server provide a custom certificate that may include SP-specific information. In this technique, a user device and a service provider server initiate communication, and a public key/private key pair is produced by the user device in association with the particular service provider. The keys may be provisioned without secure key provisioning, with the key pair stored in high-level operating system (HLOS) memory that is accessible to outside sources. Alternatively, the keys may be provisioned with secure key provisioning, with the private key stored in secure storage, requiring expensive hardware to accommodate any significant quantity of service providers. While this technique provides for a custom certificate, the storage required of the key pairs is burdensome, leads to security concerns if the private key is not stored in secure storage, and increases costs with each distinct service provider to which the user subscribes, particularly if the private key is stored in secure storage.

SUMMARY

An example of a method includes: establishing a telecommunication link between a device and a service provider system via a telecommunication network; receiving a device public key via the telecommunication network from the device at the service provider system, the device public key predating the establishment of the telecommunication link; verifying, at the service provider system, that the device stores a device private key in a secure storage area of the device, the device private key corresponding to the device public key, the device public key and the device private key being a cryptographic key pair; and authorizing, by the service provider system, sign-up of the device for service enrollment in response to verifying that the device stores the device private key in the secure storage area of the device.

Implementations of such a method may include one or more of the following features. The verifying that the device stores a device private key in a secure storage area of the device comprises finding an indication of the device public key in a whitelist database associated with a manufacturer of the device. The device public key is part of a device certificate and the device public key is received by the service provider system receiving the device certificate, and the verifying that the device stores a device private key in a secure storage area of the device comprises obtaining a device root certificate authority certificate indicating that the device certificate is trustworthy, and analyzing the device certificate for an indication that secure storage is used for the device private key. The analyzing comprises analyzing an extended key usage portion of the device certificate for the indication that secure storage is used for the device private key. The method further includes: producing a service provider certificate by the service provider system, where a public key of the service provider certificate is the device public key; signing the service provider certificate by the service provider system to produce a service-provider-signed certificate; and sending the service-provider-signed certificate from the service provider system to the device. The method further includes: sending a certificate signing request, based on the service provider certificate, from a sign-up server of the service provider system to a service provider certificate authority of the service provider system, the service provider certificate authority performs the signing of the service provider certificate; and receiving the service-provider-signed certificate from the service provider certificate authority at the sign-up server; where the sign-up server performs the sending the service-provider-signed certificate to the device. The producing the service provider certificate is performed such that at least one of a format or content of the service provider certificate is at least one of service-provider-server specific, service-provider specific, device-user specific, device specific, or subscription specific.

An example of a service provider system includes: a communication interface configured to establish a telecommunication link with a device via a telecommunication network; and a processor communicatively coupled to the communication interface and configured to: receive a device public key from the device, the device public key predating the establishment of the telecommunication link; verify that the device stores a device private key in a secure storage area of the device, the device private key and the device public key being a cryptographic key pair; and authorize sign-up of the device for service enrollment in response to verifying that the device stores the device private key in the secure storage area of the device.

Implementations of such a service provider system may include one or more of the following features. To verify that the device stores a device private key in a secure storage area of the device the processor is configured to find an indication of the device public key in a whitelist database associated with a manufacturer of the device. The device public key is part of a device certificate and the processor is configured to receive the device public key by receiving the device certificate, and where to verify that the device stores a device private key in a secure storage area of the device the processor is configured to obtain a device root certificate authority certificate indicating that the device certificate is trustworthy, and to analyze the device certificate for an indication that secure storage is used for the device private key. To analyze the device certificate the processor is configured to analyze an extended key usage portion of the device certificate for the indication that secure storage is used for the device private key. The processor is further configured to: produce a service provider certificate, where a public key of the service provider certificate is the device public key; sign the service provider certificate to produce a service-provider-signed certificate; and send the service-provider-signed certificate to the device. The processor is further configured to: send a certificate signing request from a sign-up module to a service-provider-signed certificate module; produce the service-provider-signed certificate, based on the device certificate, in the service-provider-signed certificate module; send the service-provider-signed certificate from the service-provider-signed certificate module to the sign-up module; and receive the service-provider-signed certificate at the sign-up module from the service-provider-signed certificate module; where the processor is configured to send the service-provider-signed certificate to the device from the sign-up module. The processor is configured to produce the service provider certificate such that at least one of a format or content of the service-provider-signed certificate is at least one of service-provider-server specific, service-provider specific, device-user specific, device specific, or subscription specific.

Another example of a method includes: establishing a telecommunication link between a device and service provider system via a telecommunication network; sending a device certificate via the telecommunication network from the device to the service provider system, the device certificate including a device public key, a device identity, and a digital signature, the device public key predating the establishing of the telecommunication link, the device public key corresponding to a device private key stored in secure memory of the device, the device public key and the device private key being a cryptographic key pair, the device certificate further including an indication that the device private key is stored in the secure memory of the device; and receiving, at the device from the service provider system, at least one of a service-provider-signed certificate, corresponding to the device certificate, or an authorization to sign up the device for service enrollment.

Implementations of such a method may include one or more of the following features. Sending the device certificate comprises sending the device certificate to multiple service provider systems, and the method further comprising receiving comprises receiving a respective service-provider-signed certificate from each of the service provider systems. Each of the service-provider-signed certificates has at least one of a format or content specific to at least one of a respective service provider system, a respective service provider, a service subscribed to by a user of the device, a user of the device, or the device. The method further includes storing the device private key and the device public key in the device during manufacture of the device. The storing stores the device private key in a trusted execution environment of the device during manufacture of the device.

An example of a device includes: a communication interface configured to establish a telecommunication link between the device and a service provider system via a telecommunication network; a secure memory storing a device private key; and a processor communicatively coupled to the communication interface and the secure memory and configured to: send a device certificate via the telecommunication network from the device to the service provider system, the device certificate including a device public key corresponding to the device private key, a device identity, and a digital signature, the device public key predating establishment of the telecommunication link, the device public key and the device private key being a cryptographic key pair, the device certificate further including an indication that the device private key is stored in the secure memory; and receive, via the communication interface from the service provider system, at least one of a service-provider-signed certificate, corresponding to the device certificate, or an authorization to sign up the device for service enrollment.

Implementations of such a device may include one or more of the following features. The processor is configured to send the device certificate to multiple service provider systems and to receive a respective service-provider-signed certificate from each of the service provider systems. Each of the service-provider-signed certificates has at least one of a format or content specific to at least one of the respective service provider system, a respective service provider, a service subscribed to by a user of the device, a user of the device, or the device. The secure memory is a trusted execution environment. The processor is further configured to decrypt the service-provider-signed certificate using the device private key. The processor is further configured to send, via the communication interface, the service-provider-signed certificate to a service provider server as at least part of a request for the service provider server to provide a service to the device.

DETAILED DESCRIPTION

Figure 1:
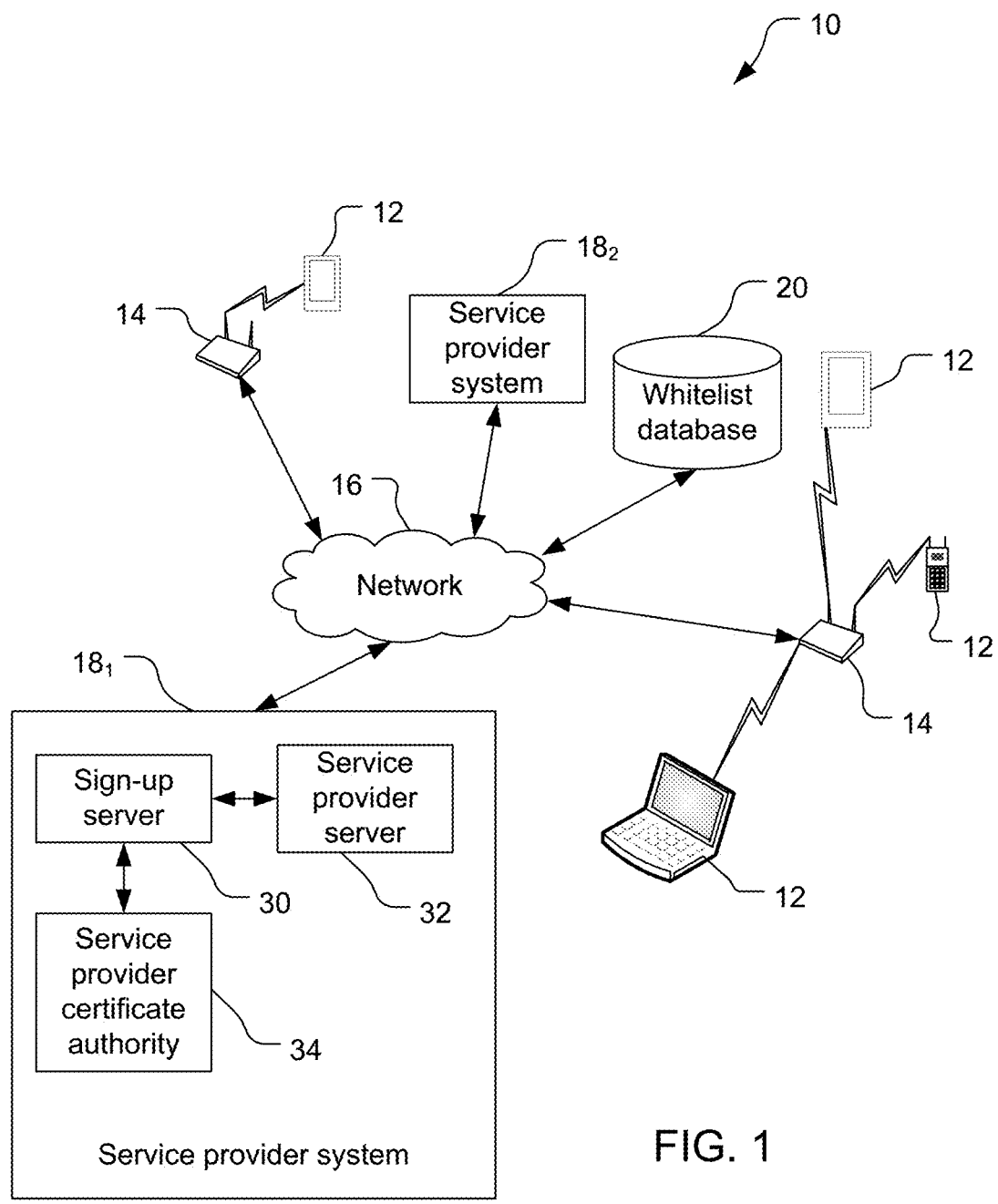
FIG. 1 is a simplified diagram of a telecommunication system.

Techniques are discussed herein for signing up on line for a service, for obtaining a service-provider-signed certificate (SP-signed certificate) for obtaining the service, and for using the SP-signed certificate to obtain the service. For example, preferably during manufacture of a user device, a cryptographic key pair is produced, including a device private key and a device public key. The device private key is stored in a secure storage area or secure memory of the user device such as a trusted execution environment. The user device contacts an on-line sign-up server (OSUS) via a communication network, and the OSUS authenticates the user device. The device provides the device public key to the OSUS and the OSUS verifies that the user device uses secure key provisioning, i.e., that the device private key, corresponding to the device public key, is stored securely at the user device. For example, the OSUS finds the device public key in a whitelist database or finds an indication of secure key provisioning in a certificate that contains the device public key and is signed by a trusted third-party certificate authority. Once secure key provisioning is verified, the OSUS authorizes the user device to sign up for service. The user provides the OSUS with user information including payment information and an indication of one or more desired services. Indications are provided to a service provider server of the service provider system as to the subscribed-to service and that the user device uses secure key provisioning. The indications may be provided by the OSUS, or may be provided by the user device sending a device certificate and an indication of the subscribed-to service to the service provider server, or by other techniques. Preferably, the device provides the device certificate to the service provider server, a service provider certificate authority signs the device certificate to produce the SP-signed certificate, and the service provider server provides the SP-signed certificate to the user device. The SP-signed certificate may be customized, e.g., based on the subscribed-to service, the user device, the user, the service provider, and/or the service provider server. The user can request service and the user device will send the SP-signed certificate to a service provider server (which may be separate from the service provider server that provided the SP-signed certificate), which will reply by providing the requested service (e.g., network access, content, etc.), if the requested service is subscribed-to by the user device. These examples, however, are not exhaustive.

Items and/or techniques described herein may provide one or more of the following capabilities, as well as other capabilities not mentioned. Strong device certificate security and dynamic, custom SP-signed certificate enrollment are provided. A custom certificate may be stored by a device for each of different service providers while only storing one device private key in the device, or at least without storing a different device private key for each service provider. A custom certificate may be stored by a device for each of different service providers, with each custom certificate containing custom information (e.g., service provider information, a custom format desired by a service provider, custom content), with the custom information potentially facilitating obtaining service from the service provider. Other capabilities may be provided and not every implementation according to the disclosure must provide any, let alone all, of the capabilities discussed.

Referring to FIG. 1, a telecommunication system 10 includes user devices 12, access points (APs) 14, a telecommunication network 16, service provider systems 18$_1$-18$_2$, and a whitelist database 20. The system 10 is a telecommunication system in that components of the system 10 can communicate with one another directly or indirectly, e.g., via the telecommunication network 16 and/or one or more of the access points 14 (and/or one or more other devices not shown, such as one or more base transceiver stations, e.g., cell towers). The example user devices 12 shown include mobile phones (including smartphones), a laptop computer, and a tablet computer. Still other user devices may be used, whether currently existing or developed in the future. While the user devices 12 shown are mobile devices, user devices such as desktop computers, televisions, and/or other user devices not typically considered to be mobile devices may be used. The user devices 12 are telecommunication devices, i.e., each device has telecommunication capability even if that is not the device's primary purpose.

Although only shown in FIG. 1 for one of the service provider systems 18, here the system 18$_1$, each of the service provider systems 18$_1$-18$_2$ includes one or more of a sign-up server 30, a service provider server 32, or a service provider certificate authority 34. For simplicity, the discussion below identifies the service provider system 18$_1$ generically as the service provider system 18, without subscript. The sign-up server 30 is configured to authenticate any of the user devices 12 that contacts the sign-up server 30, to verify that secure key provisioning is used by the user device 12, and to obtain user information from the user device 12, e.g., to identify desired service and provide required information (e.g., payment information). The service provider server 32 is configured to verify that the user device 12 uses secure key provisioning, to obtain a signature on a device certificate from the service provider certificate authority 34 to produce the SP-signed certificate, and to provide authorized (e.g., subscribed-to) service such as Internet access or content provision. The service provider certificate authority 34 is configured to produce the SP-signed certificate by signing a device certificate provided by the service provider server and to provide the SP-signed certificate to the service provider server 32 to be provided to the user device 12. The servers 30, 32, and the certificate authority 34 are discussed in more detail below.

The whitelist database 20 stores information regarding user devices that employ secure key provisioning and that are made by a particular manufacturer. Although only one database is shown in FIG. 1 for simplicity, other databases would be used, preferably with each database storing information only for devices made by one corresponding manufacturer. The database 20 stores device identities (IDs) for user devices in association with corresponding device public keys. The whitelist database 20 preferably stores the IDs and device public keys only for user devices 12 that use secure-key provisioning, i.e., that each store their respective device private key in secure memory in the respective user device 12. Alternatively, the database 20 may store device IDs and device public keys for user devices 12 that use secure key provisioning and user devices that do not use secure key provisioning. In this case, the database 20 will provide indications of which device IDs correspond to user devices 12 that use secure key provisioning.

Figure 2:
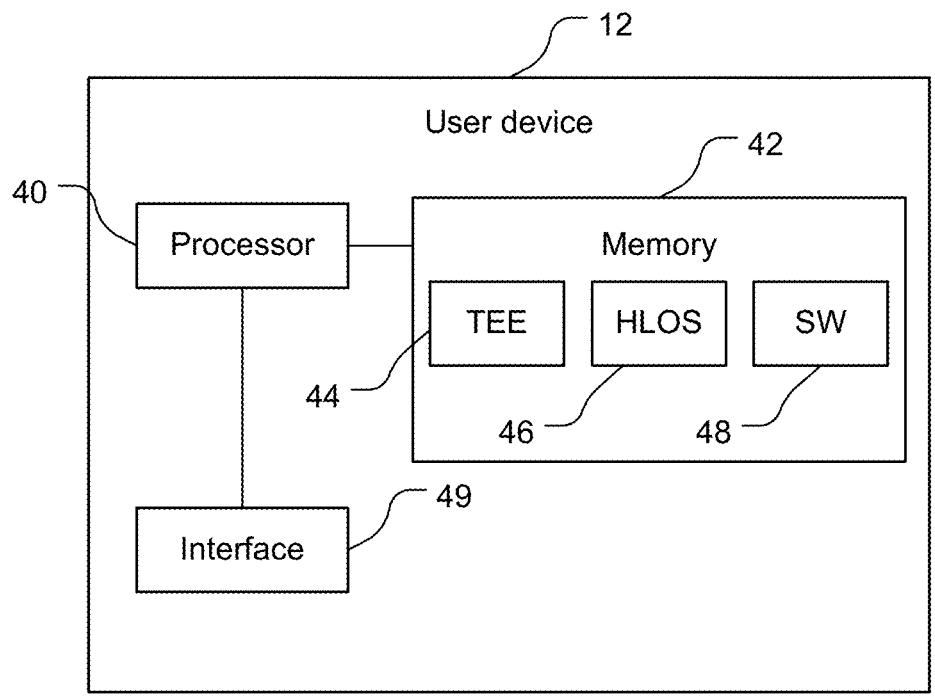
FIG. 2 is a block diagram of a user device shown in FIG. 1.

Referring also to FIG. 2, an example of one of the user devices 12 comprises a processor 40, an interface 49, and a memory 42 including a secure storage area, here a trusted execution environment (TEE) 44, a high-level operating system (HLOS) 46, and software (SW) 48. The TEE 44 is a secure element in that the TEE 44 is resistant, if not inaccessible, to access by an entity outside of the element. Conversely, the HLOS 46 is less secure and may be accessed from an entity outside of the user device 12, making the HLOS susceptible to hacking. The processor 40 is preferably an intelligent hardware device, e.g., a central processing unit (CPU) such as those made or designed by QUALCOMM®, ARM®, Intel® Corporation, or AMD®, a microcontroller, an application specific integrated circuit (ASIC), etc. The processor 40 could comprise multiple separate physical entities that can be distributed in the user device 12. The memory 42 may include random access memory (RAM) and/or read-only memory (ROM). The memory 42 is a processor-readable storage medium that may store the software 48 which is processor-readable, processor-executable software code containing instructions that are configured to, when executed, cause the processor 40 to perform various functions described herein (although the description may refer only to the processor 40 performing the functions). Alternatively, the software 48 may not be directly executable by the processor 40 and instead may be configured to cause the processor 40, e.g., when compiled and executed, to perform the functions. The processor 40 is communicatively coupled to the memory 42, that is, the processor 40 and memory 42 are configured to communicate with each other directly and/or indirectly. The interface 49 is communicatively coupled with the processor 40 and is configured to communicate bi-directionally, directly or indirectly, with the APs 14, the network 16, and/or other communications devices such as base transceiver stations. The interface 49 can establish a telecommunication link to the service provider system 18, for example by establishing a telecommunication link directly or indirectly to the network 16, and the network 16 establishing a telecommunication link directly or indirectly to the service provider system 16 in accordance with a request from the interface 49. The interface 49 can thus send information from the processor 40 to entities outside of the user device 12, and receive information from entities outside of the user device 12 and pass this information to the processor 40.

Figure 3:
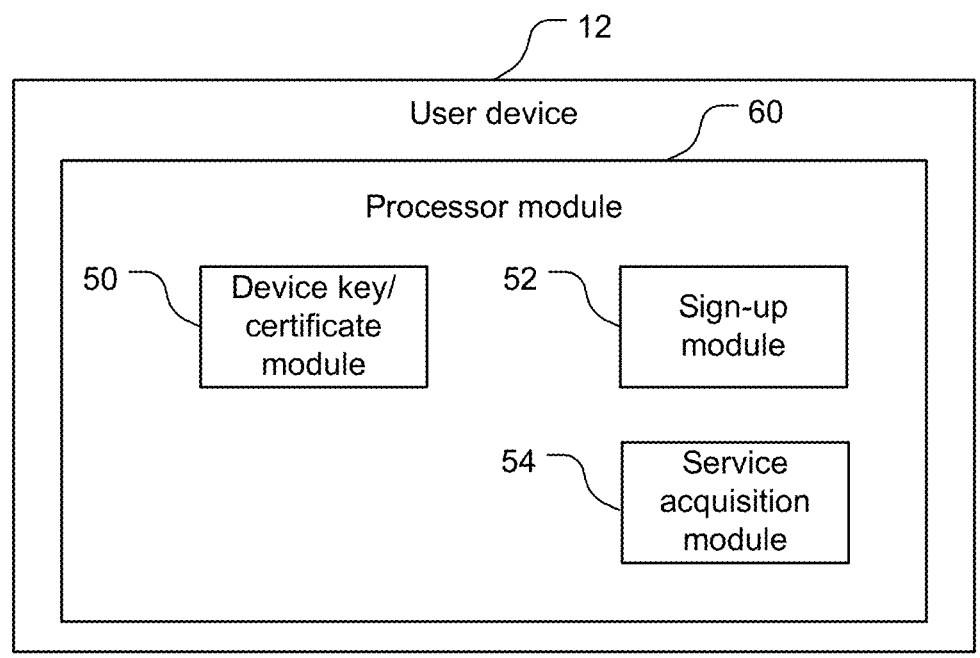
FIG. 3 is a functional block diagram of the user device shown in FIG. 2.

Referring also to FIG. 3, the user device 12 includes a processor module 60 that includes a device key/certificate module (means for producing and providing device keys and a device certificate) 50, a sign-up module (means for signing up and means for enrolling) 52, and a service acquisition module (means for acquiring service, means for obtaining service) 54. The modules 60, 50, 52, 54 are functional modules implemented by the processor 40 and the software 48 stored in the memory 42. Thus, reference to any of the modules 60, 50, 52, 54 performing or being configured to perform a function is shorthand for the processor 40 performing or being configured to perform the function in accordance with the software 42 (and/or firmware, and/or hardware of the processor 40). Similarly, reference to the processor 40 performing a function for producing or providing a device certificate, signing up the user device 12, enrolling the user device 12, or acquiring or obtaining a service, is equivalent to the device certificate module 50, the sign-up module 52, or the service acquisition module 54, respectively, performing the function.

The device key/certificate module 50 is configured to enable and implement secure key provisioning in the user device 12. The module 50 is configured to interact with an entity outside of the user device 12, e.g., during manufacture of the user device 12, to produce a cryptographic key pair including a device public key and a device private key. The module 50 is configured to store the device private key in secure memory such that the device private key is very unlikely to be, if not impossible to be, accessed from, and/or modified by, an entity outside of the user device 12. For example, the module 50 may be configured to store the device private key in the TEE 44 and to store the device public key in the HLOS 46. The module 50 may be configured to send the device public key to the sign-up module 52 but to keep the device private key secret, not sharing the device private key with entities outside of the user device 12 (i.e., sending the device private key to such entities or allowing access to the device private key by such entities).

Further, the device key/certificate module 50 may be configured to produce and provide a device certificate. The device key/certificate module 50 may be configured to compile appropriate information to form a device certificate. The device certificate preferably includes a device ID that identifies the user device 12, the device public key, and a digital signature for the device certificate. The module 50 may be configured to produce the digital signature for the device certificate using known techniques, thus providing a self-signed device certificate. Also or alternatively, the module 50 may be configured to obtain a certificate-authority-signed device certificate. In this case, the module 50 is configured to interact with a third-party certificate authority (CA) 22 (see FIG. 10) through the interface 49 to provide the third-party CA 22 with device certificate information, and to receive the device certificate from the third-party CA 22 with the device certificate including a digital signature produced by the third-party CA 22. The module 50 is configured to provide the device public key to the sign-up server 30 and/or to provide the device certificate to the sign-up module 52.

The sign-up module 52 is configured to sign up and enroll the user device 12 for service on line with the service provider system 18, in particular with the sign-up server 30. The module 52 is configured to initiate a sign-up process by contacting, via the interface 49, the service provider system 18 and providing, through the interface 49, the device public key and/or the device certificate from the device key/certificate module 50 to the service provider system 18. The module 52 is further configured to communicate bi-directionally with the system 18 to provide information requested by the system 18. For example, the sign-up module 52 may provide user information, a username, a password, payment information (e.g., credit card or bank account information), indication of desired service, and/or length of desired subscription to the service, and/or other information. The sign-up module 52 may include a user interface through which the user provides the user information. The desired service may include, for example, a type of content (e.g., audio, video, movies, TV shows, etc.) and/or a format of service (e.g., download speed (e.g., 5 MB vs. 20 MB, etc.)). Further, while the term "service" is referred to in the singular herein, the term "service" as used herein includes the plural (services) as well, and thus corresponding terms (e.g., indication) include the plural as well. That is, a user may subscribe to a single service or multiple services even though the description uses "service" in the singular. Thus, the term "service" neither requires nor excludes more than one service. The sign-up module 52 is further configured to receive an SP-signed certificate, discussed further below, from the sign-up server 30 and to provide the SP-signed certificate to the service acquisition module 54.

The service acquisition module 54 is configured to acquire or obtain service from the service provider system 18. The module 54 is configured to send a service request for service to the service provider system 18. The service request may be a single communication or more than one communication and includes the SP-signed certificate received from the sign-up server 30 via the sign-up module 52. The service provider system 18 to which the module 54 sends the service request may be the same service provider system 18 that provided the SP-signed certificate or may be another, physically distinct service provider system 18. The module 54 is configured to receive the service, for example, communication network (e.g., Internet) access, or content (e.g., a streaming video signal), and to provide the received service to the processor 40 for further appropriate processing, e.g., establishing connection through the network to a content provider, forwarding content to a display and/or a speaker for presentation to a user of the user device 12, etc.

Figure 4:
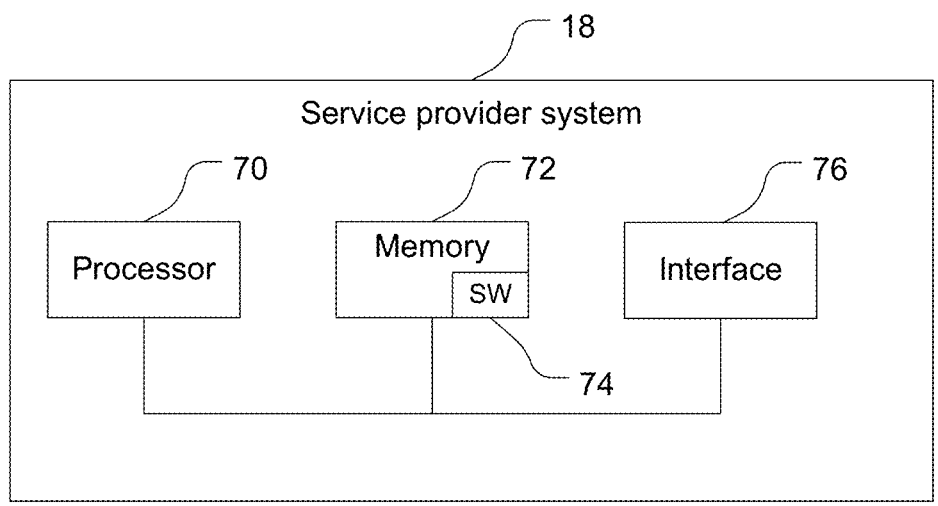
FIG. 4 is a block diagram of a service provider system shown in FIG. 1.

Referring to FIG. 4, with further reference to FIG. 1, an example of one of the service provider systems 18 comprises a processor 70, a memory 72 including software (SW) 74, and an interface 76. The processor 70 is preferably an intelligent hardware device, e.g., a central processing unit (CPU) such as those made or designed by QUALCOMM®, ARM®, Intel® Corporation, or AMD®, a microcontroller, an application specific integrated circuit (ASIC), etc. The processor 70 could comprise multiple separate physical entities that can be distributed in the service provider system 18. The memory 72 may include random access memory (RAM) and/or read-only memory (ROM). The memory 72 is a processor-readable storage medium that may store the software 74 which is processor-readable, processor-executable software code containing instructions that are configured to, when executed, cause the processor 70 to perform various functions described herein (although the description may refer only to the processor 70 performing the functions). Alternatively, the software 74 may not be directly executable by the processor 70 and instead may be configured to cause the processor 70, e.g., when compiled and executed, to perform the functions. The processor 70 is communicatively coupled to the memory 72, that is, the processor 70 and the memory 72 are configured to communicate with each other directly and/or indirectly. The interface 76 is communicatively coupled with the processor 70 and is configured to communicate bi-directionally, directly or indirectly, with the APs 14, the network 16, and/or other communications devices such as base transceiver stations. The interface 76 can establish a telecommunication link with any of the user devices 12, for example by establishing a telecommunication link directly or indirectly to the network 16, with the network 16 typically already having established a telecommunication link directly or indirectly to the user device 12 in accordance with a request from the user device 12. The interface 76 can thus send information from the processor 70 to entities outside of the service provider system 18, and receive information from entities outside of the service provider system 18 and pass this information to the processor 70.

Figure 5:
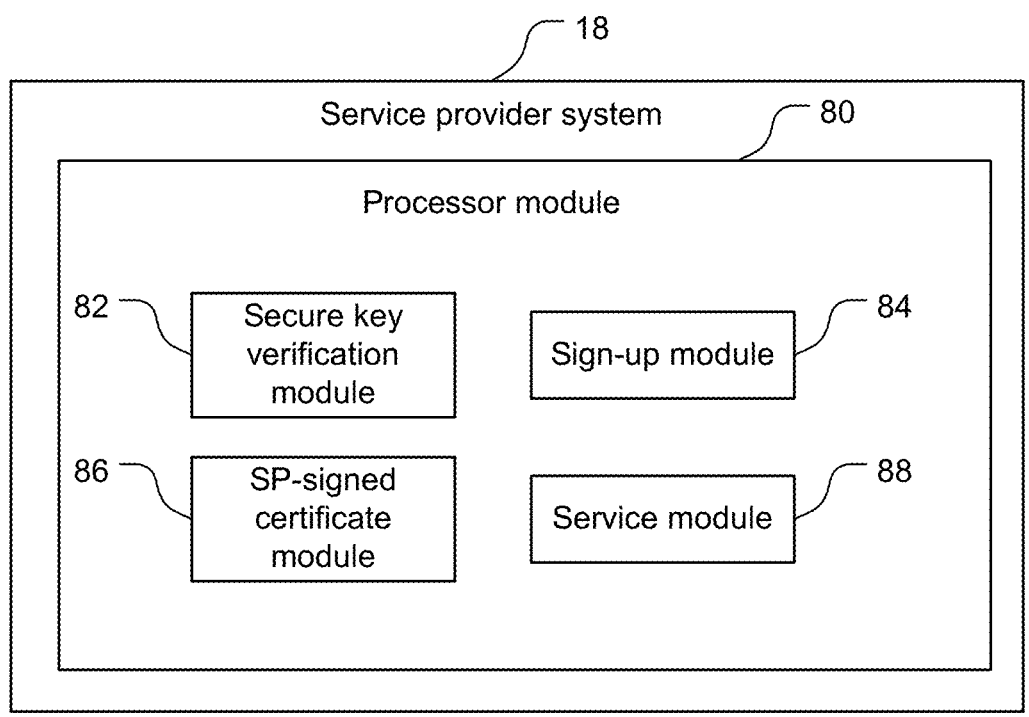
FIG. 5 is a functional block diagram of the service provider system shown in FIG. 4.

Referring also to FIG. 5, the service provider system 18 includes a processor module 80 that includes a secure key verification module (means for verifying) 82, a sign-up module (means for signing up) 84, an SP-signed certificate module (means for providing an SP-signed certificate) 86, and a service module (means for providing service) 88. The service module 88 includes an authentication, authorization, and accounting (AAA) server. The modules 80, 82, 84, 86, 88 are functional modules implemented by the processor 70 and the software 74 stored in the memory 72. Thus, reference to any of the modules 80, 82, 84, 86, 88 performing or being configured to perform a function is shorthand for the processor 70 performing or being configured to perform the function in accordance with the software 74 (and/or firmware, and/or hardware of the processor 70). Similarly, reference to the processor 70 performing a function for verifying secure key provisioning is implemented by the user device 12, signing up the user device 12, producing or providing an SP-signed certificate, or providing service to the user device 12 is equivalent to the secure key verification module 82, the sign-up module 84, the SP-signed certificate module 86, or the service module 88, respectively, performing the function.

As shown in FIG. 1, the service provider system 18 may include the sign-up server 30 and the service provider server 32, and the service provider certificate authority 34. Thus, the processor 70, the memory 72 including the software 74, and the interface 76 may be multiple, physically separate apparatus disposed in multiple, physically separate devices, but are shown in FIG. 4 as a single apparatus in a single system for simplicity. The secure key verification module 82 and the sign-up module 84 are preferably wholly implemented in the sign-up server 30. Further, the SP-signed certificate module 86 is preferably implemented wholly in the service provider certificate authority 34 as discussed further below, and the service module 88 is preferably implemented wholly in the service provider server 32.

The secure key verification module 82 is configured to authenticate a requesting user device 12, to verify whether the requesting user device 12 uses secure key provisioning, and to inform the sign-up module 52 at least if the user device 12 uses secure key provisioning. The module 82 is configured to analyze a device public key or a device certificate provided by the user device 12 to authenticate the user device 12. For example, the module 82 may be configured to determine whether a request purportedly from a user device 12 is indeed from that user device 12 and has not been altered. Further, the module 82 is configured to analyze an authenticated request in order to determine whether the user device 12 uses secure key provisioning. For example, the module 82 is configured read a device public key sent to the module 82 whether the device public key is part of a device certificate or not. If the device public key is not part of a device certificate, then the module 82 reads the device public key from a message received from the user device 12. If the device public key is part of a self-signed device certificate, then the module 82 reads the device public key by extracting the device public key from the self-signed device certificate. In any case, the module 82 is configured to determine whether the device public key appears in the whitelist database 20 corresponding to the manufacturer of the user device 12. To do this, the module 82 may send the device public key to the whitelist database 20 and receive a reply indicating whether the device public key is in the database 20. Alternatively, the module 82 may analyze the contents of the database 20 to determine whether the device public key resides in the database 20. As another example of determining whether the user device 12 uses secure key provisioning, the module 82 may be configured to analyze the content of a CA-signed device certificate for an indication that the user device 12 uses secure key provisioning (e.g., if a third-party certificate authority 22 (see FIG. 10) is used, in which case the whitelist database 20, although shown in FIG. 10, may not be used or even be present). In this case, the module 82 is configured to use the public key of the signing CA to verify the signature of the CA-signed device certificate. The module 82 may trust the content of the CA-signed device certificate once the signature is verified, and analyze the content of the CA-signed device certificate for an indication as to whether the user device 12 uses secure key provisioning. For example, the CA-signed device certificate may explicitly indicate whether secure key provisioning is used, or may implicitly indicate that secure key provisioning is not used by the device certificate having no explicit indication. The module 82 is configured to respond to confirming that the user device 12 uses secure key provisioning by authorizing sign-up of the user device 12, e.g., by sending a sign-up authorization for the user device 12 to the user device 12 (e.g., to the sign-up module 52) and to the sign-up module 84.

The sign-up module 84 is configured to interact with the user device 12 to obtain user information in response to receiving authorization to sign up the user device 12. The module 84 can communicate bi-directionally through the interface 76 to obtain the user information, with the user information being input by the user into the user device 12. The user information may include information about the user device 12, the user (e.g., a username and password), payment information (e.g., credit card details), desired service, duration for the desired service, etc.

The sign-up module 84 is further configured to produce and send a signing request to the SP-signed certificate module 86, to receive the SP-signed certificate from the SP-signed certificate module 86, and to send the SP-signed certificate to the user device 12. The signing request is based on the device certificate, e.g., with the signing request including the device certificate, or at least information from the device certificate. The sign-up module 84 is configured to produce a service provider (SP) certificate. The SP certificate may include the device public key, the device ID, an indication (e.g., in an extended key usage (EKU) portion of the SP certificate) that the user device uses secure key provisioning, and/or tailored content and/or formatting. For example, the module 84 is preferably configured to use at least some of the user information to produce the SP certificate. The module 84 may produce the SP certificate to include content and/or formatting that is server specific, user specific, subscription specific, service-provider specific, and/or device specific. Server-specific content is content associated with the server(s) producing the certificate and/or the server(s) providing the service (e.g., a server ID). User-specific content is information pertaining to (e.g., identifying, associated with, provided by) the user of the user device 12. Subscription-specific content is content characterizing the service subscription (e.g., particular service subscribed-to, duration of the subscription, etc.). Device-specific content is information in addition to the device ID and the device public key that is associated with the user device 12 that is used to subscribe to the service (e.g., device manufacturer, device model, one or more device capabilities (e.g., quantity of display pixels), etc.). Regarding formatting that is server specific, user specific, subscription specific, and/or device specific, the module 84 may produce the SP certificate with a format that depends upon information associated with one or more of the server(s) producing the SP certificate and/or providing the service, the user of the user device 12, the service subscription, or the user device 12, such as any of the content examples above. The module 84 is configured to provide the SP certificate to the module 86 as part of a certificate signing request that uses the device public key. The module 84 is configured to receive an SP-signed certificate in response to sending the signing request, and to send the SP-signed certificate to the user device 12, e.g., through the network 16 via the interface 76.

The SP-signed certificate module 86 is configured to receive the signing request from the module 84, with the signing request including the SP certificate, sign the SP certificate to produce an SP-signed certificate, and send the SP-signed certificate to the sign-up module 84. The module 86 is configured to verify (e.g., by analyzing the EKU) that the user device 12 uses secure key provisioning, to sign the SP certificate to produce the SP-signed certificate, and to send the SP-signed certificate the sign-up module 84 in the sign-up server 30.

The SP-signed certificate may include a cryptographic key other than the device public key. For example, the module 86 may obtain (e.g., produce, retrieve from memory, etc.) a symmetrical cryptographic key and include the symmetrical cryptographic key as part of the SP-signed certificate. The module 86 is configured to encrypt the SP-signed certificate, e.g., using the device public key, and is preferably configured to encrypt the SP-signed certificate whenever the SP-signed certificate includes the symmetrical cryptographic key.

The service module 88 is configured to provide subscribed-to service to the user device 12. The module 88 is configured to receive and analyze the SP-signed certificate provided by the user device 12. The module 88 can determine whether the provided certificate is authentic, e.g., by comparing content and/or formatting of the certificate with expected content and/or formatting. For example, expected content may be stored in the memory 72 and/or derived from information stored in the memory 72. Also for example, expected formatting may be indicated by information stored in the memory 72 and/or derived from information stored in the memory 72. The module 88 is configured to respond to determining that the provided SP-signed certificate is authentic by analyzing the certificate to determine whether and what service to provide, and to provide the service as appropriate. For example, the module 88 may analyze the certificate to determine what service has been subscribed to (e.g., paid for), and whether the subscription is currently valid (e.g., has not expired or otherwise been invalidated). The module 88 is further configured to provide the subscribed-to service (e.g., network access, content (e.g., gaming, music, television, movies), etc.) to the user device 12 in response to determining that the subscription is currently valid.

Figure 6:
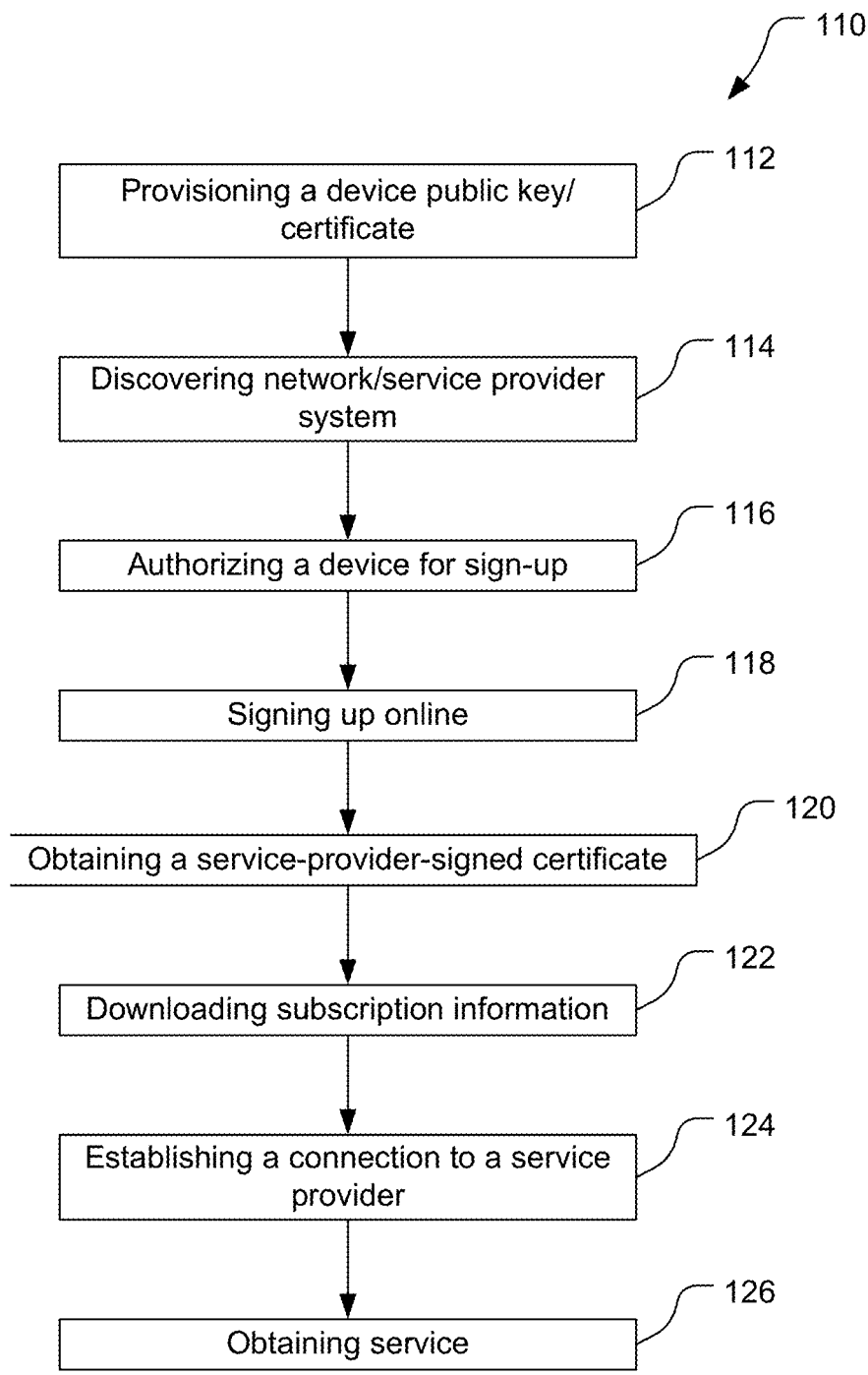
FIG. 6 is a block flow diagram of a process of authorizing sign-up and/or providing an SP-signed certificate.

Referring to FIG. 6, with further reference to FIGS. 1-5 and 7-8, a process 110 of provisioning a device public key/certificate, and subscribing to and obtaining an online service includes the stages shown. The process 110 is, however, an example only and not limiting. The process 110 may be altered, e.g., by having stages added, removed, rearranged, combined, performed concurrently, and/or having single stages split into multiple stages. For example, stage 118 can be performed before stage 116. Still other alterations to the process 110 as shown and described are possible.

As discussed further below, the process 110 involves both one of the user devices 12 and one of the service provider systems 18. The process 110 may be repeated for other user devices 12 and/or for other service provider systems 18, but for simplicity, the discussion of the process 110 refers to the user device 12 and the service provider system 18 in the singular. Within the process 110 are sub-processes, for example from the perspective of the user device 12 and from the perspective of the service provider system 18.

Figure 7:
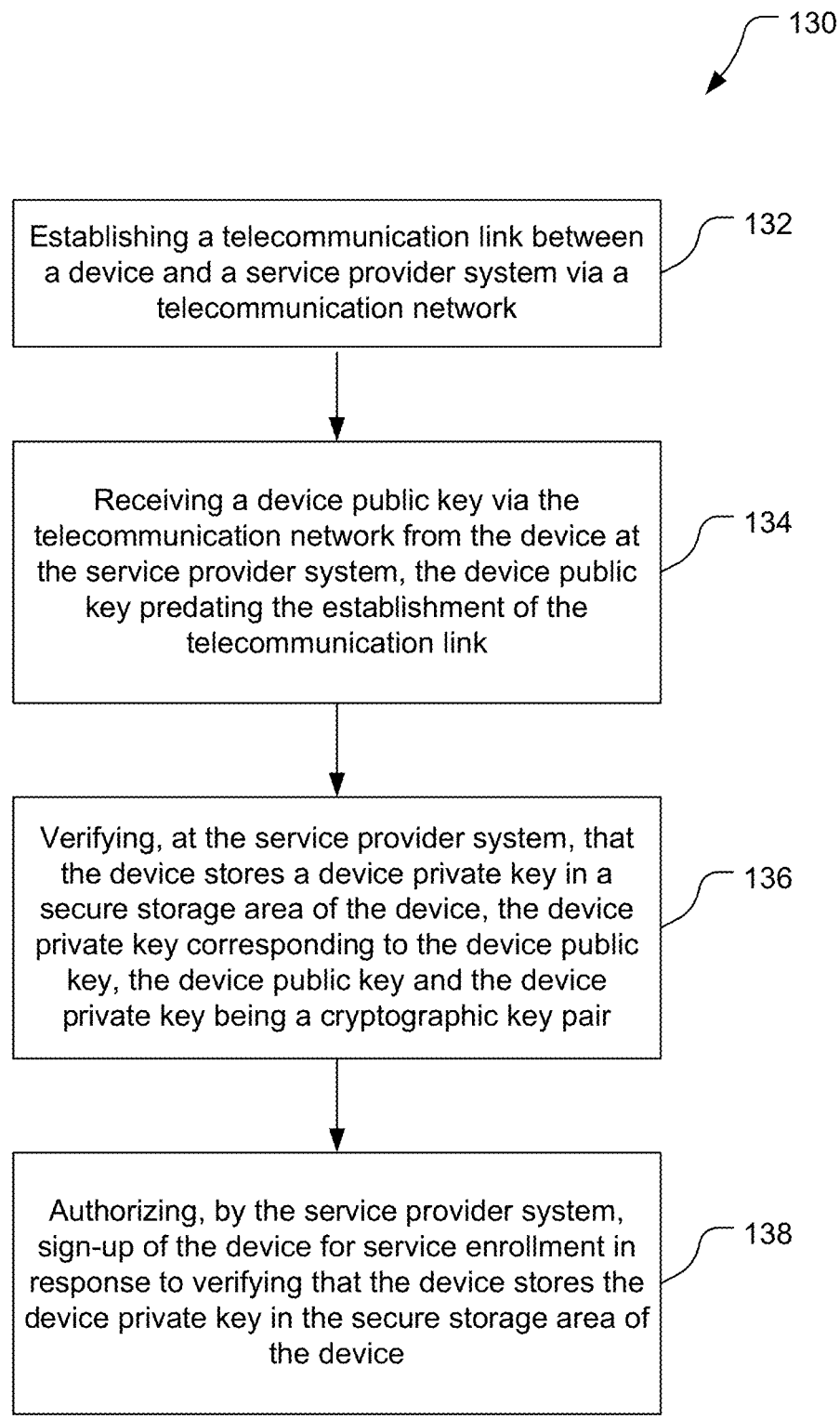
FIG. 7 is a block flow diagram of a process of signing up and/or requesting an SP-signed certificate.

For example, stage 114 and stage 116 of the process 110 from the service provider system perspective include a process 130 including the stages shown in FIG. 7. The process 130 includes a stage 132 of establishing a telecommunication link between a device and a service provider system via a telecommunication network, a stage 134 of receiving a device public key via the telecommunication network from the device at the service provider system, the device public key predating the establishment of the telecommunication link, a stage 136 of verifying, at the service provider system, that the device stores a device private key in a secure storage area of the device, the device private key corresponding to the device public key, the device public key and the device private key being a cryptographic key pair, and a stage 138 of authorizing, by the service provider system, sign-up of the device for service enrollment in response to verifying that the device stores the device private key in the secure storage area of the device. The process 130 is, however, an example only and not limiting. The process 130 may be altered, e.g., by having stages added, removed, rearranged, combined, performed concurrently, and/or having single stages split into multiple stages.

Figure 8:
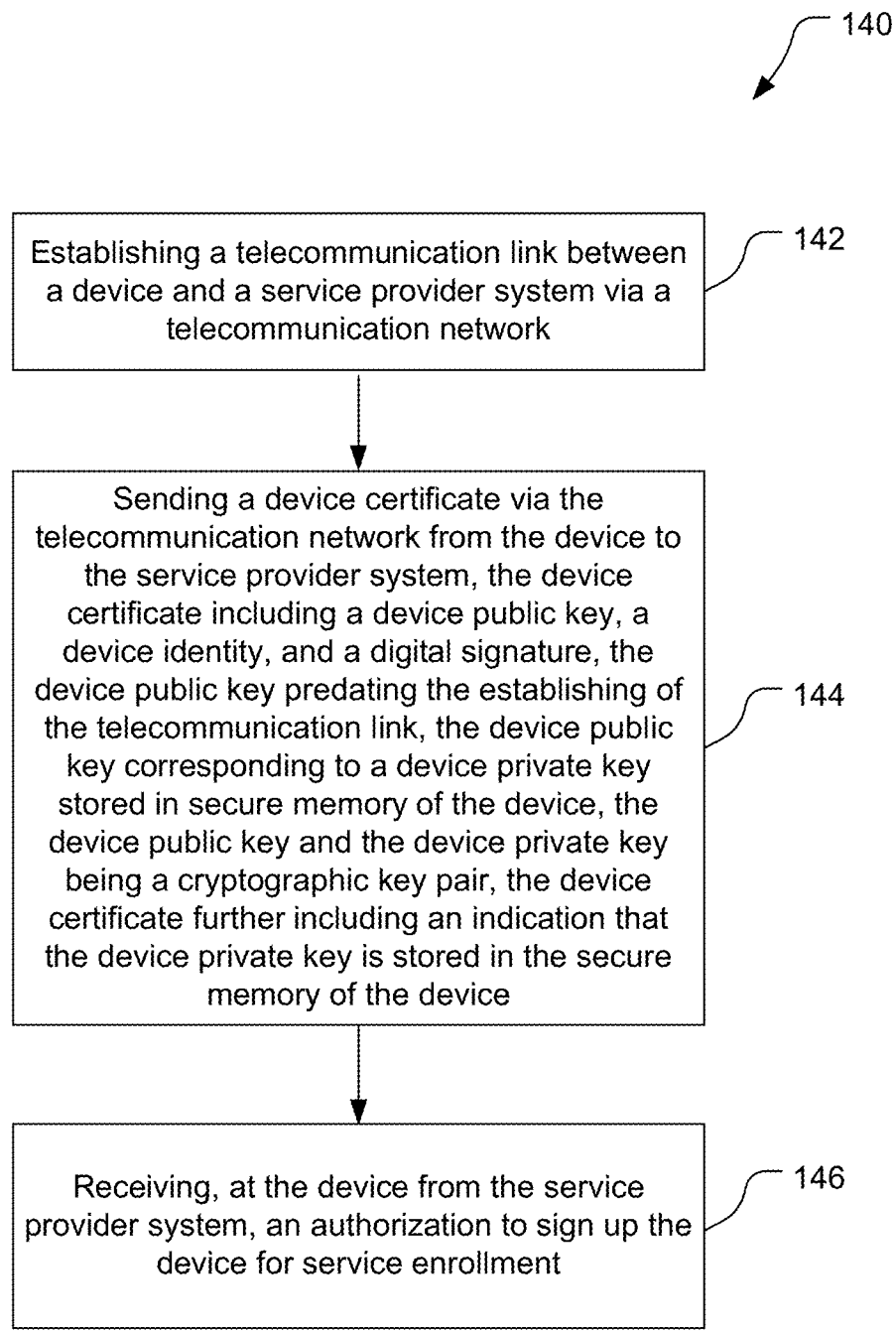
FIG. 8 is a block flow diagram of a process of subscribing to and receiving a service on line.

For another example, stage 114, and stage 116 and/or stage 120 of the process 110 from the user device perspective include a process 140 of obtaining sign-up authorization and/or an SP-signed certificate, with the process 140 including the stages shown in FIG. 8. The process 140 includes a stage 142 of establishing a telecommunication link between a device and service provider system via a telecommunication network, a stage 144 of sending a device certificate via the telecommunication network from the device to the service provider system, the device certificate including a device public key, a device identity, and a digital signature, the device public key predating the establishing of the telecommunication link, the device public key corresponding to a device private key stored in secure memory, the device public key and the device private key being a cryptographic key pair, the device certificate further including an indication that the device private key is stored in the secure memory of the device, and a stage 146 of receiving, at the device from the service provider system, an authorization to sign up the mobile device for service enrollment.

The processes 130, 140 are discussed below with respect to discussions of stages 114, 116, 120 of the process 110.

Referring again to FIG. 6, still with further reference to FIGS. 1-5 and 7-9, at stage 112, the process 110 includes provisioning a device public key/certificate (i.e., a device public key and/or a device certificate). The device key/certificate module 50 stores the device public key/certificate, and possibly generates or cooperates in the generation of the device public key/certificate. The device public key/certificate may be provisioned during manufacture of the user device 12, with the device public key and device private key being generated and the device private key being stored by the processor 40 in a secure storage area of the memory 42, e.g., in the TEE 44. Also or alternatively, the device public key/certificate may be stored in the user device 12 after manufacture of the user device 12, but not as part of a communication between the user device 12 and the service provider system 18, e.g., the device public key/certificate being stored in the user device 12 before the user device 12 establishes a telecommunication link to the service provider system 18.

At stage 114, the process 110 includes discovering the network 16 and the service provider system 18. The user device 12, and in particular the processor 40 via the interface 49, listens for system information broadcast by the network 16, and/or sends one or more communications to the network 16, to discover the network 16 and the service provider system 18 in order to send further communications via the network 16 to the service provider system 18. The service provider system 18, and in particular the processor 70 via the interface 76, receives the communication from the user device 12 and sends a reply to the user device 12. Correspondingly, at stages 132, 142, the processes 130, 140 respectively include establishing a telecommunication link between a device and a service provider system via a telecommunication network. For example, the processor 40 of the user device 12 sends a communication via the interface 49 to the network 16 with destination information indicative of the service provider system 18, e.g., a uniform resource locator (URL), and the network 16 forwards the communication (with appropriate header changes) to the service provider system 18, in particular the sign-up server 30. The sign-up server 30 replies to the user device 12 by the processor 70 sending a communication via the interface 76 to the user device 12 to complete the telecommunication link with the user device 12.

At stage 116, the process 110 includes authorizing a device for sign-up for service. From the user device perspective, the authorizing of the device includes the stages 144 and 146 of the process 140, with the stage 146 including receiving an authorization to sign-up the device for service enrollment. From the service provider system perspective, the authorizing of the device for sign-up includes the stages 134, 136, 138 of the process 130, with the stage 138 authorizing sign-up of the device for service enrollment. For example, at stages 134, 144, the user device 12, and in particular the device key/certificate module 50, sends the device public key to the sign-up server 30. The device public key (which corresponds to the device private key that is stored in secure memory in the user device 12), may be provided as part of a device certificate that further includes a device ID, and a digital signature from the user device 12 (i.e., self-signed certificate). Preferably, the device public key predates the establishment of the telecommunication link in stages 132, 142, i.e., the device public key was generated and stored in secure memory in the user device 12 before the telecommunication link from the user device 12 to the service provider system 18 was established.

At stage 136, the service provider system 18, and in particular here the secure key verification module 82 of the sign-up server 30, verifies that the user device 12 uses secure key provisioning at least for the device private key corresponding to the device public key received from the user device 12. If the device public key was provided as part of a device certificate that was self-signed by the user device 12, then the sign-up server 30 processes the digital signature to verify that the device certificate can be trusted to have come from the user device 12. Whether the device public key was provided as part of the device certificate or not, the sign-up server 30 contacts the whitelist database 20 to determine whether the device public key received from the user device 12 is present in the whitelist database 20, indicating that the user device 12 uses secure key provisioning for the corresponding device private key. For example, the sign-up server 30 sends the device public key received from the user device 12 to the database 20, and the database 20 responds by sending a communication to the sign-up server 30 indicating whether the device public key is present in the database 20.

Figure 10:
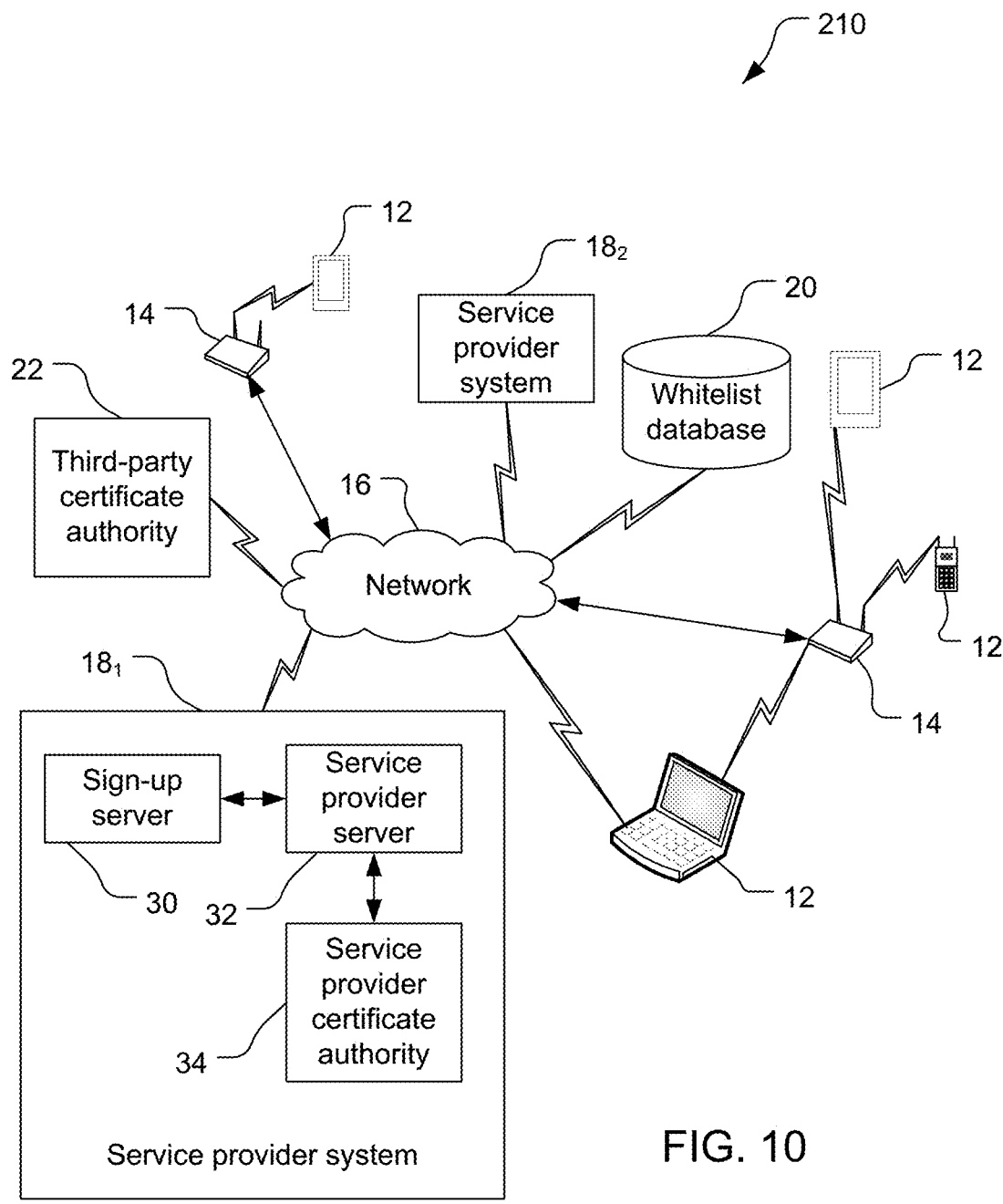
FIG. 10 is a simplified diagram of another telecommunication system.

As an alternative, if the third-party certificate authority 22 is used, as part of a telecommunication system 210 as shown in FIG. 10, to sign the device certificate, then stage 136 may comprise determining that the third-party-signed device certificate indicates that secure key provisioning is used. If the device certificate was signed by the third-party certificate authority 22, then the sign-up server 30 contacts the third-party certificate authority 22 (which is a device root certificate authority) to obtain the public key of the certificate authority 22. Instead of the sign-up server 30 sending the device public key to the database 20 and the database 20 indicating whether the device public key is present in the database 20, the sign-up server 30 sends a request for the public key to the certificate authority 22, and the certificate authority 22 sends a reply with the public key of the certificate authority 22. The sign-up server 30 uses the public key of the certificate authority 22 to determine that the device certificate is trustworthy (e.g., by decrypting all or part of the device certificate using the public key of the certificate authority 22). If the device certificate can be trusted, then the sign-up server 30 analyzes the device certificate for an indication that the user device 12 uses secure key provisioning for the device private key. For example, the sign-up server 30 reviews the EKU portion of the device certificate for this indication. If the device certificate indicates that the user device 12 uses secure key provisioning, then the use of secure key provisioning is verified and otherwise the use of secure key provisioning is not verified.

At stages 138, 146, the sign-up server 30, and in particular the secure key verification module 82, responds to the use of secure key provisioning been verified by sending an authorization to the sign-up module 84 and to the user device 12 (e.g., the sign-up module 52) indicating that the user device 12 may proceed with signing up and subscribing to the desired service. If it is verified that the user device 12 uses secure key provisioning for the device private key (e.g., the device public key is present in the database 20, or the communication that included the device public key was confirmed by the third-party certificate authority 22 to be reliable and to include an indication that secure key provisioning is used), then the process 110 may continue with the sign-up server 30 responding by authorizing sign-up of the user device. Otherwise, the process 110 preferably ends such that the user device 12 is not permitted to obtain a SP-signed certificate, or another process is used to provide the user device 12 with an SP-signed certificate.

At stage 118, the process 110 includes signing up online. The sign-up module 52 of the user device 12 and the sign-up module 84 of the sign-up server 30 engage in a bidirectional communication through which the user device 12 provides the sign-up server 30 with user information. The sign-up server 30 to which the user device 12 provides the user information may be the same physical entity or a different physical entity, but if a different physical entity, the sign-up server 30 is still considered to be part of the same service provider system 18. The user of the user device 12 provides information about the user and/or the desired service, including selecting the desired service, providing payment information, providing a username and password, etc. Stage 118 is typically performed after stage 116 and before stage 120, but may be performed before stage 116, in which case stage 116 would not include sending a sign-up authorization.

At stage 120, the process 110 includes obtaining an SP-signed certificate. Here, the process 110 may include the stages 134, 136, 138 of the process 130 and the stages 144, 146 of the process 140 similar to the discussion of these stages provided above, e.g., if enrollment is through a physically separate sign-up server 30 than used for sign up. Whether this optional communication is performed or not, the sign-up module 84 in the sign-up server 30 produces an SP certificate (discussed above), optionally communicating with the service provider server 32 as appropriate. The sign-up module 84 sends a certificate signing request (including the SP certificate) to the service provider certificate authority 34. The SP-signed certificate module 86 in the service provider certificate authority 34 verifies that the user device 12 uses secure key provisioning, e.g., by analyzing the EKU in the SP certificate, and responds to this verification (if performed) by signing the SP certificate to produce an SP-signed certificate. The SP-signed certificate module 86 sends the SP-signed certificate to the sign-up module 84 in the sign-up server 30. The sign-up module 84 sends the SP-signed certificate to the user device 12, and optionally to the service module 88.

At stage 122, the process 110 includes downloading subscription information. The service provider server 32 sends subscription information to the user device 12 in one or more communications. The subscription information may include detailed information regarding the subscribed-to service, an AAA server certificate, policy information, an indication of frequency of policy update, etc.

At stage 124, the process 110 includes establishing a connection to a service provider. The user device 12, and in particular the service acquisition module 56, establishes a connection with the service provider system 18, and in particular the service module 88 of the service provider server 32. The particular service provider server 32 contacted by the user device 12 may or may not be the identical physical entity that provided the SP-signed certificate but would be capable of providing the subscribed-to service. For example, the service provider server 32 contacted at stage 124 may be physically closer to the user device 12 during stage 124 than the service provider server 32 that provided the SP-signed certificate, with the two service provider servers 32 typically being owned or controlled by a common entity.

At stage 126, the process 110 includes obtaining service. The user device 12, and in particular the service acquisition module 56, sends the SP-signed certificate to the service provider server 32 with an indication, if needed (e.g., not explicit or implicit in the SP-signed certificate), of the desired service. The service module 88 (in particular the AAA of the service module 88) of the service provider server 32 determines whether the provided SP-signed certificate is authentic as appropriate, and provides the service to the user device 12 if the SP-signed certificate is authentic.

Some or all of the process 110 may be repeated for other service providers and/or other services. For example, all of the stages of the process 110 may be repeated for different service provider systems 18. Preferably, though not necessarily, stage 112 would be omitted from repetitions of the process 110 with other service provider systems 18. In either case, the user device 12 may send the device public key (possibly in a device certificate) to multiple service provider systems 18 and obtain respective SP-signed certificates from these server provider systems 18 for use in obtaining corresponding service. If stage 112 was repeated, the device private key generated during this stage would be stored in secure memory of the user device 12. As another example, stages 124, 126 may be repeated using the same SP-signed certificate multiple times with the same service provider server 32 and/or different service provider servers 32.

Figure 9:
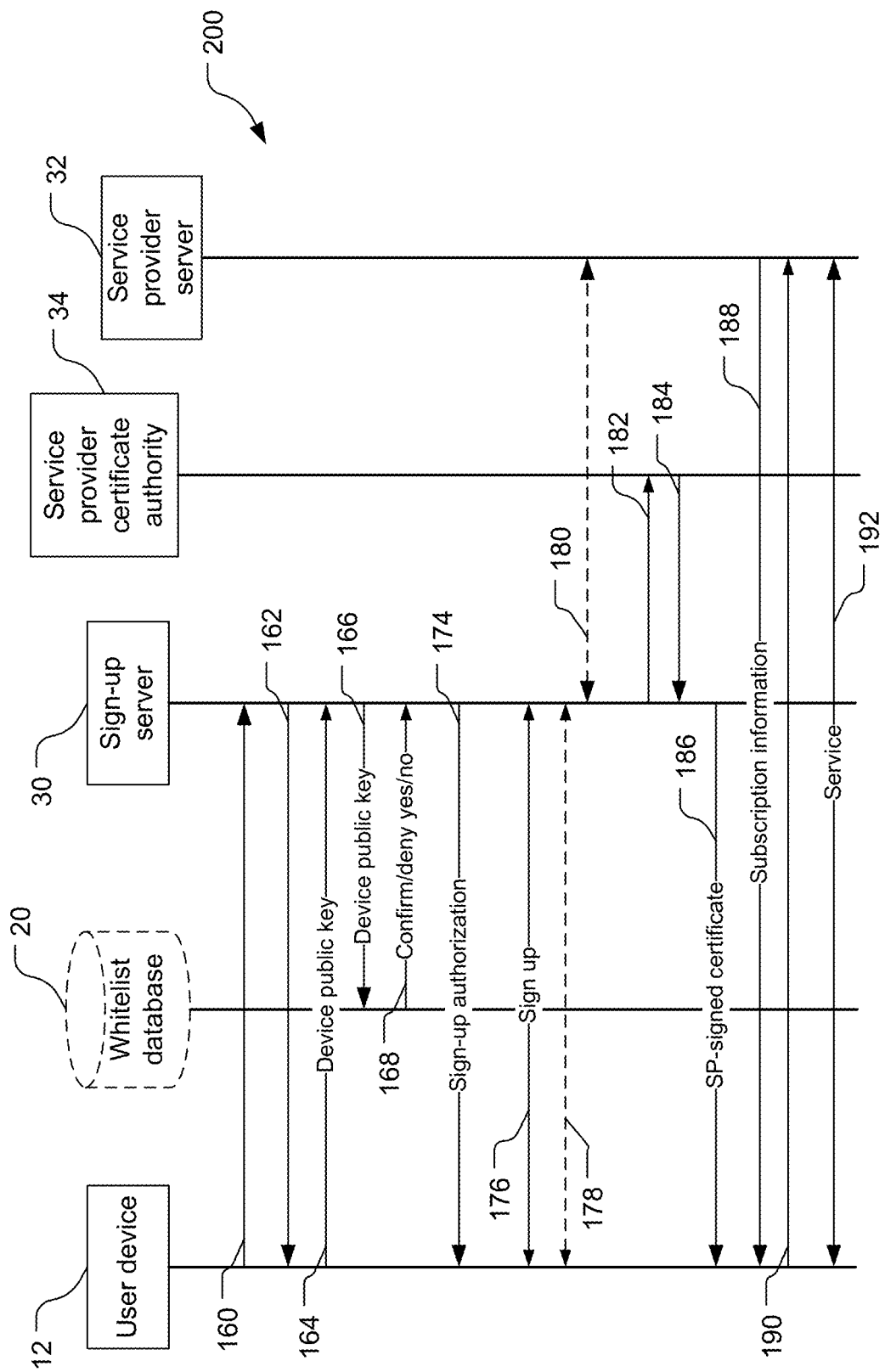
FIG. 9 is a message flow diagram of a process of obtaining an SP-signed certificate and obtaining a service online using the SP-signed certificate.

Referring to FIG. 9, with further reference to FIGS. 1-5, a process 200 of verifying that secure-key provisioning is used, signing up for service, obtaining an SP-signed certificate, and obtaining a subscribed-to service includes the stages shown. The process 200 is, however, an example only and not limiting. The process 200 may be altered, e.g., by having stages added, removed, rearranged, combined, performed concurrently, and/or having single stages split into multiple stages. For example, stage 178 and/or stage 180 may be omitted. Still other alterations to the process 200 as shown and described are possible. Further, while the network 16 is not shown in FIG. 9, many of the communications discussed below may be transmitted through the network 16, whether this is explicitly noted or not.

At stages 160, 162, 164, 166, 168, 174, secure-key provisioning is verified and sign up is authorized. At stage 160, the user device 12 sends a communication via the interface 49 to the network 16 with destination information indicative of the service provider system 18, and the network 16 forwards the communication 160 to the appropriate service provider system 18, in particular to the sign-up server 30. At stage 162, the sign-up server 30 replies to the user device 12 to complete a telecommunication link between the user device 12 and the sign-up sever 30. At stage 164, the user device 12 sends a device public key of the user device 12 to the sign-up server 30. The public key may be sent without being part of a device certificate, or may be part of a self-signed certificate or part of a third-party signed certificate. If the device public key was provided without being part of a certificate, or being part of a self-signed certificate, at stage 166 the secure key verification module 82 of the sign-up server 30 sends the device public key to the whitelist database 20 (preferably after extracting the device public key from a self-signed certificate, if appropriate). At stage 168, the whitelist database 20 searches for the device public key and confirms or denies to the sign-up server 30 that the device public key is contained in the whitelist database 20, and thus whether secure-key provisioning is used for the device private key corresponding to the device public key received from the user device 12. Alternatively, if the device public key was part of a third-party signed certificate, then instead of stages 166, 168, the sign-up server 30 verifies the third-party signed certificate and analyzes the certificate to determine whether secure-key provisioning is used for the device private key corresponding to the device public key received from the user device 12. At stage 174, the module 82 having determined that secure-key provisioning is used for the device private key corresponding to the device public key received from the user device 12, sends a sign-up authorization to the user device 12.

At stages 176, optionally stages 180, 182, and stages 182, 184, 186, the user signs up for subscribed-to service and obtains an SP-signed certificate. At stage 176, the sign-up module 52 of the user device 12 and the sign-up module 84 of the sign-up server 30 engage in a bidirectional communication through which the user device 12 provides the sign-up server 30 with user information. Stage 178 is an optional, e.g., if a different physical entity is being contacted for enrollment than contacted for sign up, confirmation of secure-key provisioning being used by the user device 12. Stage 180 is an optional communication between the sign-up module 84 and the service provider server 32 to obtain information, as appropriate, for an SP certificate. At stage 182, the sign-up module 84 produces the SP certificate and sends a signing request for the SP certificate to the SP-signed certificate module 86 of the service provider certificate authority 34. At stage 184, the SP-signed certificate module verifies that the user device 12 uses secure key provisioning, signs the SP certificate to produce an SP-signed certificate, and sends the SP-signed certificate to the sign-up module 84. If the module 86 does not verify that secure-key provisioning is used, then the module 86 does not sign the SP certificate, and sends a denial of the signing request to the sign-up module 84. At stage 186, the sign-up module 84 sends the SP-signed certificate (or an indication of the denial of such a certificate) to the user device 12.

At stages 188, 190, 192, the user device 12 obtains subscribed-to service. At stage 188, the service provider server 32, in particular the service module 88, provides subscription information to the user device 12 as appropriate. At stage 190, the user device sends a request for service to the service module 88. The request for service preferably includes the SP-signed certificate received from the sign-up server 30 corresponding to the service provider server 32, i.e., that is part of the same service provider system 18 as the service provider server 32 to which the request is sent. At stage 192, the service module 88 authenticates the SP-signed certificate, determines whether the requested service is subscribed to (e.g., paid for), and if so, provides the subscribed-to service to the user device.

Other Considerations

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, "or" as used in a list of items prefaced by "at least one of" or "one or more of" indicates a disjunctive list such that, for example, a list of "at least one of A, B, or C," or a list of "one or more of A, B, or C," means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include that the information is conveyed from a sending entity but does not reach an intended recipient of the information. The intended recipient, even though not actually receiving the information, may still be referred to as a receiving entity, e.g., a receiving execution environment.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. A method comprising:
   establishing a telecommunication link between a device and a service provider system via a telecommunication network;
   receiving, from the device at the service provider system, a communication comprising a device public key for the device, via the telecommunication network, the device public key predating the establishment of the telecommunication link;
   verifying, at the service provider system, based on verification data from at least one other device, obtained using the communication comprising the device public key for the device, that the device stores a device private key in a secure storage area of the device, wherein the device private key corresponds to the device public key, with the device public key and the device private key being a cryptographic key pair; and
   authorizing, by the service provider system, sign-up of the device for service enrollment in response to verifying, based on the verification data from the at least one other device, obtained using the communication comprising the device public key for the device, that the device stores the device private key in the secure storage area of the device, wherein authorizing the sign up of the device for the service enrollment for the service provider system comprises providing to the device, when the device private key is determined to be stored in the secure storage area of the device, a service-provider-specific custom certificate.

2. The method of claim 1, wherein verifying that the device stores the device private key in a secure storage area of the device comprises finding an indication of the device public key in a whitelist database associated with a manufacturer of the device.

3. The method of claim 1, wherein the communication comprises a device certificate, and wherein the device public key is part of the device certificate and the device public key is received by the service provider system receiving the device certificate, and wherein the verifying that the device stores the device private key in the secure storage area of the device comprises obtaining a device root certificate authority certificate indicating that the device certificate is trustworthy, and analyzing the device certificate for an indication that secure storage is used for the device private key.

4. The method of claim 3, wherein the analyzing comprises analyzing an extended key usage portion of the device certificate for the indication that secure storage is used for the device private key.

5. The method of claim 1, further comprising:
   producing a service provider certificate by the service provider system, wherein a public key of the service provider certificate is the device public key;
   signing the service provider certificate by the service provider system to produce a service-provider-signed certificate; and
   sending the service-provider-signed certificate from the service provider system to the device;
   wherein the service-provider-specific custom certificate comprises the service-provider-signed certificate.

6. The method of claim 5, further comprising:
   sending a certificate signing request, based on the service provider certificate, from a sign-up server of the service provider system to a service provider certificate authority of the service provider system, the service provider certificate authority performs the signing of the service provider certificate; and receiving the service-provider-signed certificate from the service provider certificate authority at the sign-up server;

wherein the sign-up server performs the sending the service-provider-signed certificate to the device.

7. The method of claim 5, wherein the producing the service provider certificate is performed such that at least one of a format or content of the service provider certificate is at least one of service-provider-server specific, service-provider specific, device-user specific, device specific, or subscription specific.

8. A service provider system comprising:

a communication interface configured to establish a telecommunication link with a device via a telecommunication network; and a hardware-based processor communicatively coupled to the communication interface and configured to:

receive, from the device, a communication comprising a device public key for the device, the device public key predating the establishment of the telecommunication link;

verify, based on verification data from at least one other device, obtained using the communication comprising the device public key for the device, that the device stores a device private key in a secure storage area of the device, with the device private key and the device public key being a cryptographic key pair; and authorize sign-up of the device for service enrollment in response to verifying, based on the verification data from the at least one other device, obtained using the communication comprising the device public key for the device, that the device stores the device private key in the secure storage area of the device, wherein the hardware-based processor configured to authorize the sign up of the device for the service enrollment for the service provider system is configured to provide to the device, when the device private key is determined to be stored in the secure storage area of the device, a service-provider-specific custom certificate.

9. The system of claim 8, wherein to verify that the device stores the device private key in the secure storage area of the device the processor is configured to find an indication of the device public key in a whitelist database associated with a manufacturer of the device.

10. The system of claim 8, wherein the communication comprises a device certificate, and wherein the device public key is part of the device certificate and the processor is configured to receive the device public key by receiving the device certificate, and wherein to verify that the device stores the device private key in the secure storage area of the device the processor is configured to obtain a device root certificate authority certificate indicating that the device certificate is trustworthy, and to analyze the device certificate for an indication that secure storage is used for the device private key.

11. The system of claim 10, wherein to analyze the device certificate the processor is configured to analyze an extended key usage portion of the device certificate for the indication that secure storage is used for the device private key.

12. The system of claim 8, wherein the processor is further configured to:

produce a service provider certificate, wherein a public key of the service provider certificate is the device public key;

sign the service provider certificate to produce a service-provider-signed certificate; and send the service-provider-signed certificate to the device;

wherein the service-provider-specific custom certificate comprises the service-provider-signed certificate.

13. The system of claim 12, wherein the processor is further configured to:

send a certificate signing request from a sign-up module to a service-provider-signed certificate module;

produce the service-provider-signed certificate, based on the device certificate, in the service-provider-signed certificate module;

send the service-provider-signed certificate from the service-provider-signed certificate module to the sign-up module; and receive the service-provider-signed certificate at the sign-up module from the service-provider-signed certificate module;

wherein the processor is configured to send the service-provider-signed certificate to the device from the sign-up module.

14. The system of claim 12, wherein the processor is configured to produce the service provider certificate such that at least one of a format or content of the service-provider-signed certificate is at least one of service-provider-server specific, service-provider specific, device-user specific, device specific, or subscription specific.

15. A method comprising:

establishing a telecommunication link between a device and a service provider system via a telecommunication network;

sending a device certificate via the telecommunication network from the device to the service provider system, the device certificate including a device public key, a device identity, and a digital signature, the device public key predating the establishing of the telecommunication link, the device public key corresponding to a device private key stored in secure memory of the device, the device public key and the device private key being a cryptographic key pair, the device certificate further including an indication that the device private key is stored in the secure memory of the device; and receiving, at the device from the service provider system, an authorization to sign up the device for service enrollment, wherein the authorization to sign up the device for the service enrollment for the service provider system comprises a service-provider-specific custom certificate provided to the device by the service provider system when the device private key is determined to be stored in the secure memory of the device.

16. The method of claim 15, wherein sending the device certificate comprises sending the device certificate to a plurality of service provider systems, the method further comprising receiving a respective service-provider-signed certificate from each of the plurality of service provider systems.

17. The method of claim 16, wherein each of the plurality of service-provider-signed certificates has at least one of a format or content specific to at least one of a respective service provider system, a respective service provider, a service subscribed to by a user of the device, a user of the device, or the device.

18. The method of claim 15, further comprising storing the device private key and the device public key in the device during manufacture of the device.

19. The method of claim 18, wherein the storing stores the device private key in a trusted execution environment of the device during manufacture of the device.

20. A device comprising:
a communication interface configured to establish a telecommunication link between the device and a service provider system via a telecommunication network;
a secure memory storing a device private key; and
a processor communicatively coupled to the communication interface and the secure memory and configured to:
send a device certificate via the telecommunication network from the device to the service provider system, the device certificate including a device public key corresponding to the device private key, a device identity, and a digital signature, the device public key predating establishment of the telecommunication link, the device public key and the device private key being a cryptographic key pair, the device certificate further including an indication that the device private key is stored in the secure memory; and
receive, via the communication interface from the service provider system, when the device private key is determined to be stored in the secure memory of the device, at least one of a service-provider-signed certificate, corresponding to the device certificate, or an authorization to sign up the device for service enrollment.

21. The device of claim 20, wherein the processor is configured to send the device certificate to a plurality of service provider systems and to receive a respective service-provider-signed certificate from each of the plurality of service provider systems.

22. The device of claim 21, wherein each of the plurality of service-provider-signed certificates has at least one of a format or content specific to at least one of the respective service provider system, a respective service provider, a service subscribed to by a user of the device, a user of the device, or the device.

23. The device of claim 20, wherein the secure memory is a trusted execution environment.

24. The device of claim 18 wherein the processor is further configured to decrypt the service-provider-signed certificate using the device private key.

25. The device of claim 20 wherein the processor is further configured to send, via the communication interface, the service-provider-signed certificate to a service provider server as at least part of a request for the service provider server to provide a service to the device.

26. The method of claim 1, wherein the verification data from the at least one other device, obtained using the communication comprising the device public key for the device, comprises an indication of whether the cryptographic key pair of the device was produced according to a secure key provisioning process.

27. The method of claim 1, wherein providing the service-provider-specific custom certificate comprises:
providing, when the device private key is determined to be stored in the secure storage area of the device, the service-provider-specific custom certificate for storage at a memory area of the device accessible to systems outside the device without providing a device service-provider-specific private key.

* * * * *